United States Patent [19]

McNeel

[11] Patent Number: 5,010,531

[45] Date of Patent: Apr. 23, 1991

[54] THREE-DIMENSIONAL GEOPHONE

[75] Inventor: William O. McNeel, Houston, Tex.

[73] Assignee: Western Atlas International, Inc., Houston, Tex.

[21] Appl. No.: 415,559

[22] Filed: Oct. 2, 1989

[51] Int. Cl.$^5$ .............................................. H04R 1/02
[52] U.S. Cl. ................................ 367/188; 174/74 R; 174/74 A; 174/77 R; 174/77 S; 181/122; 181/401; 367/177; 367/178
[58] Field of Search ................ 174/74 R, 74 A, 77 R, 174/77 S; 181/122, 401; 367/177, 178, 188

[56] References Cited

U.S. PATENT DOCUMENTS

| | | | |
|---|---|---|---|
| 2,477,172 | 7/1949 | Brownlow | 367/188 |
| 4,117,449 | 9/1978 | McNeel | 367/188 |
| 4,300,220 | 11/1981 | Goff et al. | 367/188 |
| 4,637,001 | 1/1987 | Annoot | 367/177 |
| 4,733,378 | 3/1988 | Pearce et al. | 367/188 |
| 4,811,311 | 3/1989 | Woodall, Jr. et al. | 367/178 |

OTHER PUBLICATIONS

Litton Brochure, Geophone Cases, Litton Resources Systems, 1984, pp. 1-4.
Mark Products, Inc., TDC-II Brochure.
Oyo Corporation U.S.A. Brochure.

*Primary Examiner*—Deborah L. Kyle
*Attorney, Agent, or Firm*—Barry C. Kane

[57] ABSTRACT

A light weight and compact geophone assembly for detecting transient seismic signals along orthogonal axes. The geophone assembly having a plurality of geophones arranged within close proximity of each other within a compact housing. The geophones are interconnected to a conductor cable passing through the housing in a unique water-tight sealing arrangement. At the cable entrance into the housing, the conductor cable is surrounded by a tapered boot compressed about the cable by a sleeve which in turn is fixed in place by a locking nut. The locking nut is received by complementary threads at the cable entrance into the housing. When tightened, the locking nut forces the compression sleeve over the tapered surface of the boot, compressing the boot about the cable. In addition, the locking nut and compression sleeve urge the boot in compression between the cable and the housing. Located atop of the housing is a bubble leveling device. The level is recessed within the top of the housing and is equipped with a means for magnifying the bubble level. The bottom of the housing is equipped with ground coupling spikes to engage the housing with the earth. After the geophone assembly is firmly coupled to the earth, the operator adjusts the depth of each spike to level the housing. A level housing assures proper operation of the enclosed geophones within the housing.

11 Claims, 2 Drawing Sheets

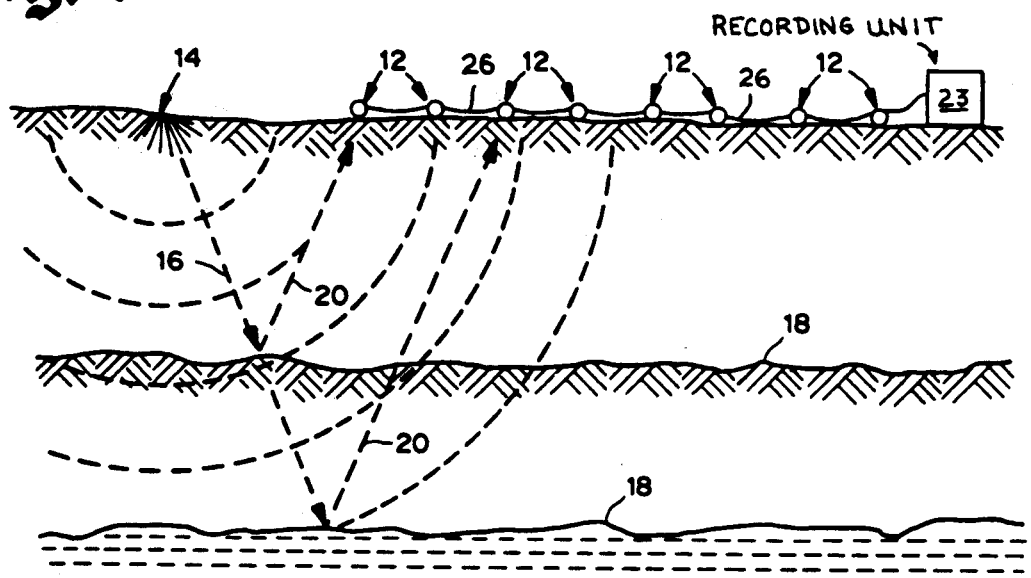
fig. 1
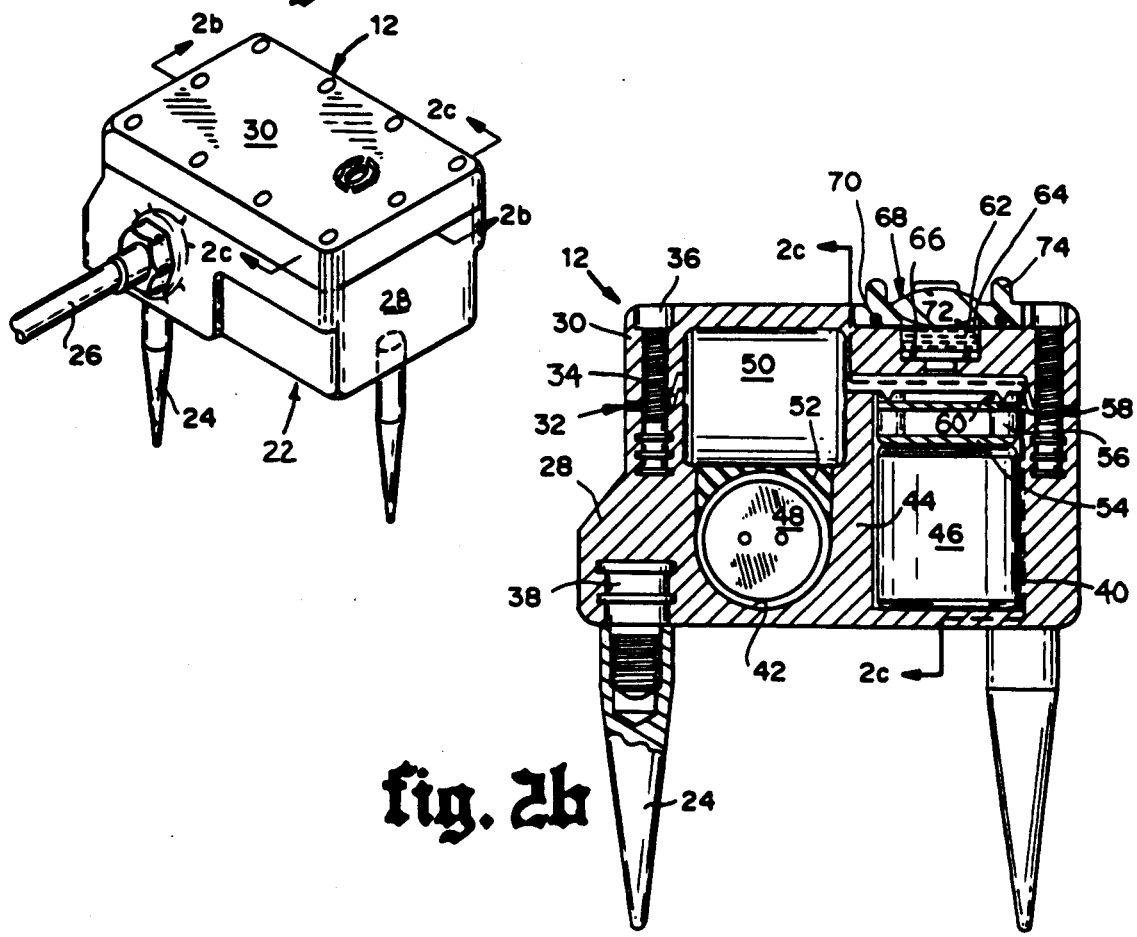
fig. 2a
fig. 2b

THREE-DIMENSIONAL GEOPHONE

BACKGROUND OF THE INVENTION

1. Field of the Invention

This invention relates to seismometers for detecting transient seismic signals in the earth and particularly to a sensor for detecting orthogonal components of such signals on land or in shallow water environments.

2. Brief Description of the Related Art

Seismic exploration involves the surveying of subsurface layers using reflected acoustic impulses artificially introduced in the subsurface. To conduct such a survey, a array of seismic cables may be located along the surface of the earth, interconnecting strings of geophones to a centrally-located recording station. Traditionally, each geophone consisted of a single sensing unit oriented perpendicular to the surface of the earth so as to detect upward propagating waves, and thus was only able to record one component of the seismic signal, e.g. the vertical component. However, horizontal components of a seismic signal have become of extreme interest to the geophysicist. To detect horizontal and vertical components of a seismic signal, three geophones are often employed, each located in a single plane with their axes of sensitivity oriented perpendicular to each other. In this configuration, the three sensors detect the two horizontal components and the vertical component which are computationally combined to determine subsurface propagation characteristics.

Prior three-dimensional (3-D) geophone units employed three individual geophones, each disposed in the same plane with their axes of sensitivity oriented orthogonal to each other. Oyo Corporation's Model SC-3D and Mark Products' Model L-400 have a circular housing with the three geophones located equidistant from each other in the same plane. LRS (formerly Litton Resources Systems, Inc.), a division of Western Atlas International, Inc., employs a rectangular housing with the three geophones disposed along the longitudinal axis of the housing. These 3-D geophones are much larger and heavier in comparison to single geophone units. Since each unit is larger, each seismic cable must be shorter to enable the field hand to carry the geophones to the surface location. Thus more man-power is expended to place the same number of 3-D geophones than to place the same number of single geophone units. There has been a long felt yet unresolved need for a more compact and lighter 3-D geophone assembly in order to provide the same subsurface coverage as in single geophone applications.

Geophones in general have a tendency to flood when exposed to shallow bodies of water. The geophone units mentioned above also suffer this problem. One particular source of flooding is the electrical cable entrance into the housing. There has been a long felt and unsolved need for a geophone housing rugged enough to withstand prolonged field use and yet retain its water-tight integrity.

In light of these prior disadvantages, it is an object of this invention to provide a 3-D geophone of reduced size for ease in handling, thus enabling more geophones per unit length of cable. It is another object of this invention to provide a 3-D geophone which is waterproof/resistant when exposed to shallow water environments.

SUMMARY OF THE INVENTION

An improved 3-D geophone having a compact housing is provided. A bubble level to assist in orienting the housing with respect to the gravitational vertical is located in the exterior of the housing. Three geophones are located within the housing; at least one of which is stacked upon another to reduce the size of the housing. Each of the geophones is oriented within the housing such that their axes of sensitivity are orthogonal to each other. Interconnecting the geophones to a remote recording unit is a cable passing through an opening in the housing and enclosed by a unique seal held by a compressional sleeve and a locking nut. Extending from the bottom of the geophone assembly is at least one, but preferably three spikes for piercing the ground and providing an improved coupling between the earth and the geophone housing.

BRIEF DESCRIPTION OF THE DRAWING FIGURES

A better understanding of the invention may be obtained by referring to the following detailed description of the invention and the appended drawing figures, wherein:

FIG. 1 generally illustrates a seismic survey;

FIG. 2a is an enlarged oblique view of a geophone contemplated by this invention and employed in the seismic survey in FIG. 1;

FIGS. 2b-2c are elevational cross-sections of the geophone shown in FIG. 2a.

DETAILED DESCRIPTION OF A PREFERRED EMBODIMENT

Figure 2C:
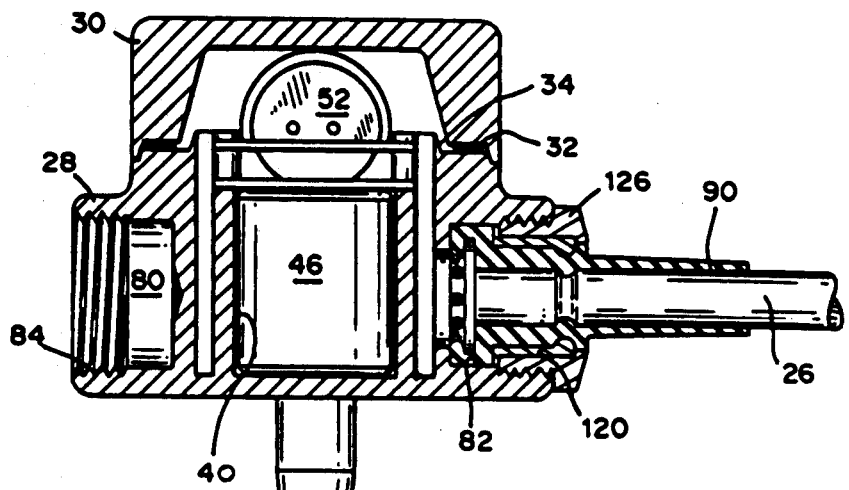

The instant invention is directed towards a lightweight and smaller 3-D geophone assembly for detecting seismic signals than previously existed. In referring to the drawing figures, like numerals will occasionally appear, indicating similar or like components of the assembly.

FIG. 1 generally illustrates a seismic survey. The surface of the earth 10 may have at plurality of geophones 12 distributed above a subsurface region of interest. Located at another point on or near the surface may be a seismic source 14. It may be preferred that a plurality of such sources 14 be located at substantially the same point so as to behave as a point source as is well known in the art. Examples of such sources include mechanical vibrators, explosives, or borehole sources such as resonators or air guns. Actuation of the seismic source(s) 14 imparts seismic signal 16 in the earth. Such signals 16 propagate downward as a spherically spreading wave front, impinge upon the various subsurface layers 18 and are reflected back towards to the surface by the acoustic impedance differences between the formations. The reflected seismic signals 20 arriving at the surface 10 are detected by the many geophones 12, converted to electrical or optional signals, and sent through an interconnecting conductor cable 26 to a central recording unit or device 23 where they are stored for later processing.

FIG. 2a is an enlarged oblique view of one example of a geophone contemplated by this invention and employed in the seismic survey in FIG. 1. Such a geophone 12 may be comprised of a generally rectangular housing 22 preferably made from a polycarbonate material formed by injection molding or other well known construction technique. Coupled to the bottom of the geophone 12 may be several ground-coupling spikes 24 well known in the art. One or more conductor cables 26 may extend from the side of the geophone 12 to operably couple enclosed sensors to the remote recording unit.

FIGS. 2b-2c illustrate different cross-sectional views of the geophone of FIG. 2a. The housing 22 may include a lower case 28 adapted at one end to receive a cap 30. A seal 32 such as a rubber gasket is located between the case 28 and the cap 30 resting about a lip 34 defined along the upper portion of the case. The cap 30 closes the case and compresses the seal 32 when it is secured by screws 36, affecting a water tight seal. The bottom of the casing may contain a plurality of nuts or threaded posts 38 to receive the coupling spikes 24 mentioned previously. The spikes and the various coupling possibilities are well known in the industry and will not be discussed herein.

The interior of the case may contain a singular chamber, although in a preferred embodiment of this invention two chambers 40 and 42 are defined, each partially separated from the other by a wall 44 extending substantially to the top of the two chambers. Chambers 40 and 42 may be off-center in the case with chamber 40 generally cylindrical in shape and oriented such that its longitudinal axis is vertical. Chamber 42 may also be a semi-cylindrical depression or trough with its longitudinal axis oriented horizontally. The dimensions of each chamber 40 or 42 may be substantially the same as the outer dimensions of the sensors to be described below, with sufficient room to provide for the electrical connections.

Located in chamber 40 may be a sensor 46 with its axis of sensitivity to the seismic signals disposed vertically and parallel to the axis of the chamber. Disposed within and cradled by chamber 42 may be a second sensor 48 with its axis of sensitivity also parallel with the axis of the chamber. Immediately above the horizontal sensor 48 and separated by a compliant member 52 may be a third sensor 50 having its axis of sensitivity horizontal and perpendicular to the axes of the other two sensors 46 and 48. The compliant member 52 between sensors 48 and 50 may be a saddle-type mount to retain the sensor 48 firmly within chamber 42 as well as cradle the third sensor 50. The saddle mount 52 is preferably made from an elastomeric material such as neoprene rubber which may be compressed by the upper sensor 50 when the cap 30 is secured to the case 28. Those skilled in the art will readily understand the type of sensor to be used in the geophone assembly and thus a detailed discussion will not be provided. But generally a sensor (also individually known as a geophone) may consist of a wire coil suspended in a magnetic field by two resilient springs. Those skilled in the art will appreciate that for any given travel distance of the coil, the maximum tilt angle of operation at any specific natural frequency can be predicted. A typical vertical 14-hertz sensor will normally tilt to approximately a fifty-five degree angle before it ceases to operate. A 10-hertz sensor will normally tilt to approximately thirty-five degrees before it becomes inoperable. Thus, the lower the natural frequency of the sensor, the more acute the tilt angle becomes before it ceases to operate. The limitation of a horizontal sensor's tilt angle of operation is much more severe than that of vertical sensors due to the different vectorial-restoring forces of gravity. The assembly procedure of a horizontal sensor is very similar to that of a vertical sensor. However, in its construction a bottom spring is reversed to support the coil assembly and held in place by a well known retainer ring. In this configuration, the vertical sensor now becomes a horizontal sensor. Unlike the vertical sensor, the top spring and the bottom spring are now diametrically opposing. The natural resonant frequency of the sensor remains the same. There are virtually no restoring forces required from the springs. As long as the sensor remains in or near the horizontal plane the sensor will function satisfactorily and its electrical characteristics will be maintained.

Refer back to the Figures. Lying atop sensor 46 may be a retainer plate 54 adapted to retain the sensor within the chamber. Coupled to the top of the retainer plate and separated therefrom by spacers 56 may be a printed-circuit (PC) board 58. Both the retainer plate 54 and the PC board 58 are fastened to the case 28 by way of screws 60. The PC board 58 acts as a communication crossroads between the several sensors and the conductor cable mentioned above, having sufficient number of conductor contacts to interconnect the sensors with the conductor cable.

Located in the cap 30 to the case 28 may be a means for determining when the housing is level when engaged with the earth. The leveling means may be comprised of a bubble level 62 preferably mounted in a depression or counter-sink 64. Located in the bottom of the depression 64, between the bubble level 62 and the cap 30, may be an O-ring seal 66 to act as a cushion. The level 62 may be retained within the depression by a durable, transparent cover 68 and a second O-ring 70 fixed against the cap 30 by several screws (not shown). The transparent cover 68 preferably has a lens 72 surrounded along its periphery by a plurality of projections 74. The lens 72 magnifies the bubble in the depression 64. The projections 74 encircling the lens have a higher relief and act as a barrier preventing abrasion of the lens and reducing impacts by foreign objects.

Figure 3A:
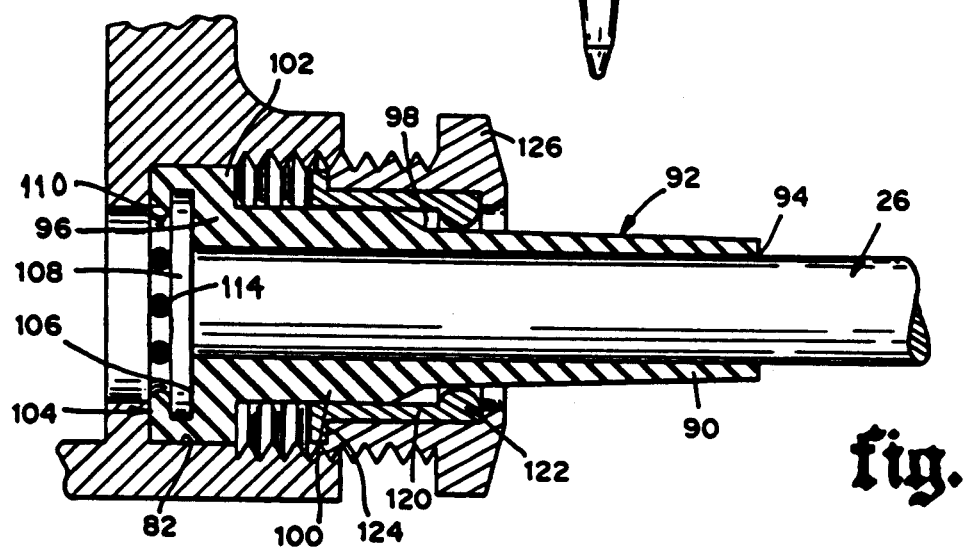
FIGS. 3a and 3b are enlarged illustrations of a sealing arrangement for a conductor cable shown in FIGS. 2a-2c.
Figure 3B:
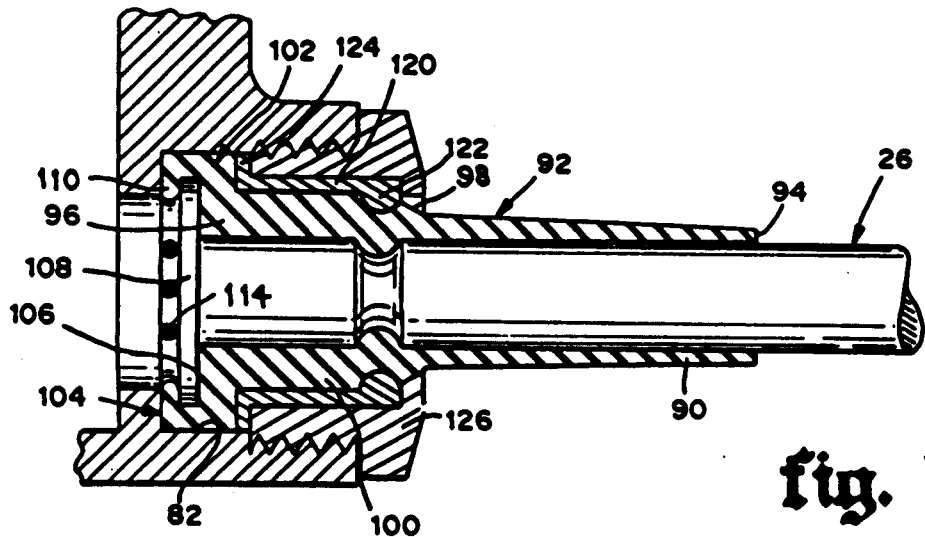

Refer to FIGS. 2c, 3a and 3b with respect to the coupling relationship between the geophone and the conductor cable. As shown in the FIG. 2c, at least one and preferably two holes 80 and 82 extend through the walls of the housing 28. Of the two holes depicted in the Figure, only hole 82 actually penetrates into the housing. As shown, the other hole 80 does not fully penetrate for reasons to be described below and may be capped off. The outer portion of each hole may be threaded at 84 to receive a complementary-threaded cap or locking nut. The bore 82 provides access for the conductor cable 26 having a sufficient number of conductors to operably couple each of the sensors to the remote recording unit. In applications where several of the geophones are to be placed in series, a second conductor cable may be provided access to the sensors in a similar fashion though hole 80. Those skilled in the art of geophysical exploration will understand the basic electrical requirements for such applications.

FIGS. 3a and 3b are enlarged illustrations of a sealing arrangement for a conductor cable shown in FIGS. 2a-2c. Concentrically received along the conductor cable 26 and tightly fitting thereabout may be a boot 90 made from an elastomeric material such as neoprene rubber. Although neoprene is suggested, other materials may be found to work equally as well. The boot 90 may have a tapered exterior surface 92 extending from a thin distal end 94 and increasing towards a thick proximal end 96 received within hole 82. A relatively abrupt change in the taper profile occurs at point 98 before terminating in a substantially constant diameter portion 100 near the proximal end 96. At the proximal end 96 of the boot 90, an outer flange 102 may be formed having a circumference substantially equal to that of the bore 82. An end face 104 of the flange 102 may contain a depression or recess 106 concentric with the axis of the boot. Located within the depression may be a cable anchor 108, retained therein by an inner flange 110 defined in the depression. The cable anchor 108 may be a disk having a plurality of holes extending therethrough for receiving the many conductors in the conductor cable 26. The disk is necessarily manufactured from a non-conductive material to prevent electrical shorting across the conductors. The cable anchor retains the transmission cable 26 by fixing a solder block 114 to each conductor inboard of the cable anchor, thus preventing the withdrawal of the conductors through the cable anchor.

Concentrically received along the conductor cable 26 and partially surrounding boot 90 may be a compression sleeve 120 having an inner diameter slightly less than the outer diameter of the constant diameter portion 100 of the boot 90. At one end of the sleeve 120, the inside diameter is reduced forming a compression ring 122. The opposite end of the sleeve has an outer flange 124, the outer dimensions of which are similar to the flange 102 of the boot. Surrounding the compression sleeve 120 may be a locking nut 126. The threads of the locking nut 126 engage threads 84 in the bore 82, fixing the transmission cable, boot, and compression sleeve against the case 28 when tightened. As the locking nut 126 is tightened within bore 82, the end of the locking nut engages the outer flange 124 of the compression sleeve 120, forcing the sleeve up the tapered surface 92 of the boot. As the compression sleeve moves up the tapered surface, the compression ring gradually compresses the boot about the transmission cable. Once the locking nut is tightened substantially all the way, the compression ring 120 has moved up over the point 98 of the profile increase, substantially compressing the boot about the cable, affecting a water-tight seal. In addition to compressing the boot about the transmission cable, the locking nut 126 urges the outer flange 124 of the compression sleeve 120 against the proximal end 96 of the boot and placing the flanges 102 and 110 of the boot in compression with the end of the bore 82, again affecting a water-tight seal with the housing.

Once the geophone assembly has been assembled and appropriate wiring changes have been to couple it to the transmission cable, the collection of geophone assemblies and cable are transported to the region of interest. As the cable is laid along the surface of the earth, the geophone assemblies are coupled to the earth by an field operator. To couple the geophone assembly to the earth, the operator orients the geophone assembly such that the bubble level is upward. The geophone assembly is then pushed downward so that the spikes pierce the earth. While anchoring the geophone assembly in the earth, the operator views the bubble level and makes appropriate adjustments to level the housing before moving on to the next geophone assembly.

My invention has been described with a certain degree of specificity, particularly in reference to using electrical sensing units. Modifications and variations, such as adapting this invention to optical fiber technology, will occur to those skilled in the art and are considered to be within the scope of this invention which is limited only by the appended claims, wherein:

I claim as my invention:

1. An apparatus for detecting transient signals along orthogonal axes, comprising in combination:
   (a) a housing;
   (b) a plurality of sensors orthogonally disposed within said housing, at least one of the sensors being located above another of the sensors and separated therefrom by a compliant member;
   (c) conductor means extending through said housing for interconnecting said sensors to a remote recording unit;
   (d) means for substantially sealing said conductor means with said housing; and
   (e) means disposed within the sealing means for anchoring the conductor means to the apparatus.

2. The apparatus of claim 1, wherein the conductor means extending through said housing for interconnecting said sensors to a remote recording unit is comprises of at least one cable having at least one conductor therein.

3. The apparatus as defined by claim 2, wherein the means for substantially sealing said conductor means with said housing, comprises:
   (a) a boot enclosing a portion of the cable proximate the housing;
   (b) a compression ring concentrically received about the boot; and
   (c) a locking nut concentrically received about the compression ring, the locking nut threadably received by the housing, forcing the compression ring up and over the boot thereby compressing the boot tightly about the cable and urging the boot in a sealing engagement with the housing.

4. The apparatus as defined in claim 1, further comprising means for determining when said housing is level.

5. An assembly for detecting orthogonal components of a transient signal propagating through a medium, comprising in combination:
   (a) a housing coupled to the medium;
   (b) a plurality of sensors fixed within the housing and disposed along orthogonal axes, at least one of the sensors being disposed above another of the sensors and separated therefrom by a compliant member;
   (c) conductor means extending through the housing for interconnecting the sensors to a remote recording device;
   (d) means concentrically about the conductor means for sealing the conductor means with the housing;
   (e) means within the housing for determining when the housing is in a preferred orientation with respect to a gravitational vertical; and
   (f) means, integral within the sealing means for fixing the conductor means with the assembly.

6. The assembly as defined in claim 5, wherein the means concentrically about the conductor means for sealing the conductor means with the housing, comprises:
   (a) a elastomeric boot;
   (b) means engaging the housing and concentrically received about the boot for urging the boot in compression with both the housing and the conductor means.

7. The apparatus as defined in claim 5, wherein the conductor means, comprises a conductor cable having at least a single conductor therein.

8. The apparatus as defined in claim 5, wherein at least one of the sensors is disposed above another of the sensors.

9. A three-dimensional geophone assembly for detecting orthogonal components of a transient seismic signal propagating through the earth, comprising in combination:

(a) a housing defining a cavity therein and having at least one opening extending through a side thereof;

(b) a plurality of sensors orthogonally disposed within the cavity, at least one of the sensors disposed above the plurality and separated therefrom by a compliant member;

(c) transmission means extending through the opening in the housing for interconnecting the plurality of sensors to a remote unit;

(d) a compliant boot having a tapered exterior surface engaging the opening and the transmission means;

(e) a compression sleeve concentrically received about and adapted to engage the tapered surface of the compliant boot for placing the boot in sealing engagement about the transmission means;

(f) a locking nut engaging the compression means the housing for retaining the boot in sealing engagement with the housing and about the transmission means;

(g) means coupled to the housing for indicating a predetermined orientation of the housing with respect to a gravitational vertical; and (h) means coupled to the housing for penetrating the earth and coupling the housing thereto.

10. The geophone assembly as defined in claim 9, wherein the retaining means comprises a locking nut received by the housing.

11. The geophone assembly as defined in claim 9, further comprising means for anchoring the transmission means with the geophone assembly.

* * * * *